Sept. 5, 1967 — P. I. NORDSTROM — 3,339,533
AIR FILTER FOR INTERNAL COMBUSTION ENGINES
Filed Jan. 26, 1967
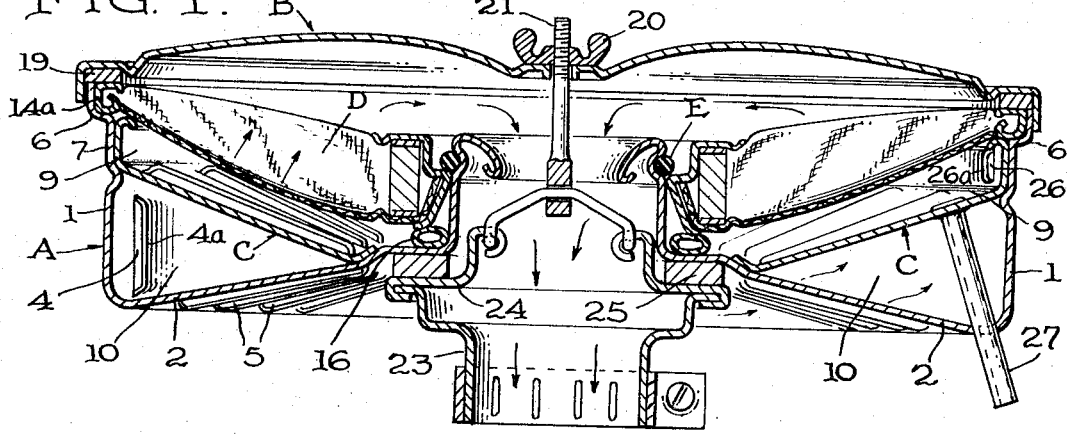
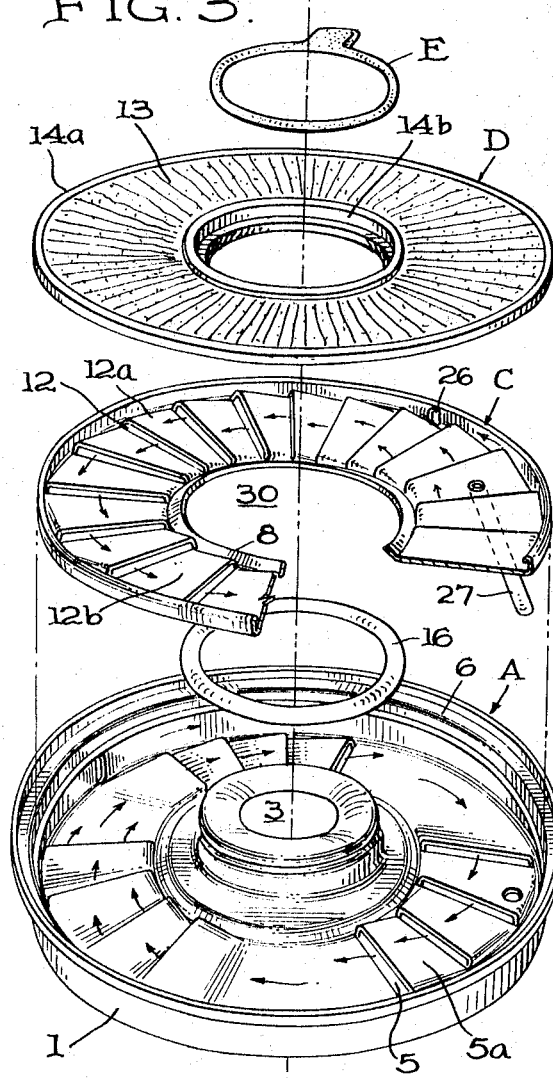
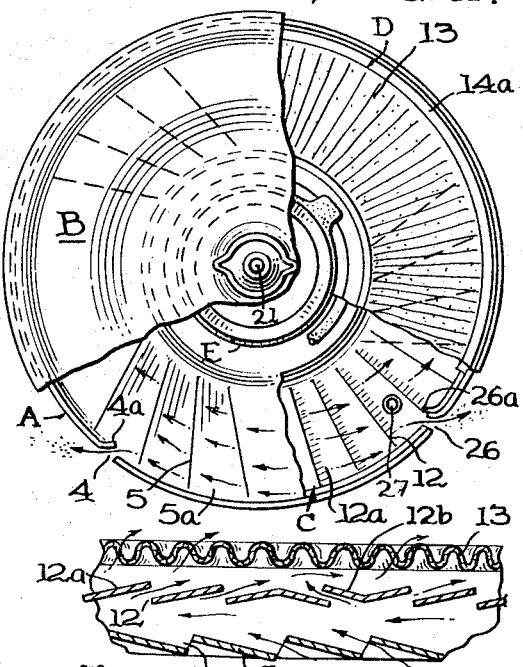
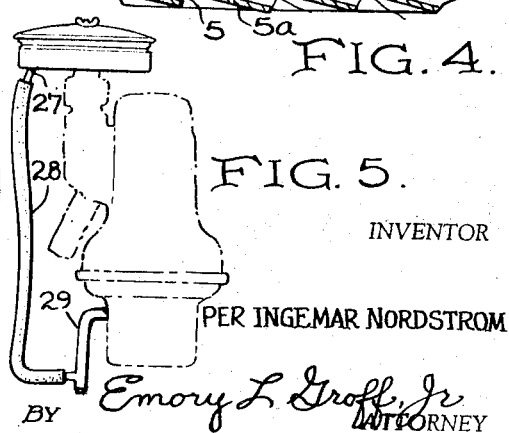
INVENTOR
PER INGEMAR NORDSTROM
BY Emory L. Groff, Jr.
ATTORNEY United States Patent Office 3,339,533
Patented Sept. 5, 1967

3,339,533
AIR FILTER FOR INTERNAL COMBUSTION ENGINES
Per Ingemar Nordstrom, Entre Rios 913,
Buenos Aires, Argentina
Filed Jan. 26, 1967, Ser. No. 611,943
3 Claims. (Cl. 123—119)

ABSTRACT OF THE DISCLOSURE

An air filter assembly having a substantially cylindrical casing with a louvered bottom wall and a louvered partition within the casing and spaced from the bottom wall to provide a plurality of air treating chambers. The air being treated in the chambers is whirled centrifugally to eject solid particles to the atmosphere through openings in the casing sidewall prior to the air passing through a filter element of porous material en route to the carburetor. Vapors from the engine are aspirated directly into one of the chambers to impregnate dust particles therein and at the same time moisten the filter element.

This application is a continuation-in-part of my application Serial No. 327,373 filed December 2, 1963 now abandoned.

The present invention relates to an air filter assembly for internal combustion engines and provides within a casing, a pair of communicating chambers separated by a partition and a filter disc of porous material located upstream of the second chamber and surrounding an air outlet tube through which filtered air passes to the carburetor of the engine.

The primary object of the invention is to provide a practical and economic means of filtering air supplied to the combustion chamber of an internal combustion engine in a more thorough and efficient manner than those filters in common use today.

The efficiency of my filter assembly is accomplished by a combination of factors which are essentially as follows: incoming air is whirled centrifugally in each of the two chambers due to louvered openings formed in the bottom wall of each chamber, the vanes of the openings in one bottom wall being oriented in a direction opposite to the vanes of the openings in the other bottom wall to cause the air to reverse its direction in the second or upper chamber. An opening or openings are provided in the sidewall of each chamber, each opening provided with an inwardly extending flange to facilitate expelling solid particles entrained in the moving air. Means are provided to connect one of said chambers with the crankcase of the engine to permit vapors therefrom to moisten the filter disc and to mix with the air being filtered and impregnate solid particles in the air. This treatment increases the weight of the particles and makes them more likely to be ejected into the atmosphere through the aforesaid openings rather than clog the disc of porous material as air is aspirated toward the carburetor.

In the drawings:

FIGURE 1 is a vertical cross section of the filter, showing the arrangement of its various parts, in their assembled position.

FIGURE 2 is a plan view of the filter shown in FIGURE 1 wherein a portion of the top cover and some of the component parts of the filter have been partially cut away.

FIGURE 3 is an exploded perspective view of the casing, partition, filter element and retaining ring of the filter assembly.

FIGURE 4 is an enlarged partial cross section of the bottom wall of the casing, the partition and filter element.

FIGURE 5 is a diagrammatic elevational view showing the filter installed on an internal combustion engine.

Similar reference characters designate corresponding parts throughout the several figures of the drawings.

Referring to the drawings in detail, the filter according to the present invention comprises, essentially, a casing A, a removable cover B, a partition C mounted in the casing and spaced from the bottom wall thereof, and a filter element D of appropriate material disposed between and spaced from the partition and covered. The filter assembly also provides means permitting it to be installed on the carburetor or air intake of an engine, as well as means to aspirate the oily vapors from the crankcase or from the engine into the filter proper.

The casing A comprises a sidewall 1 of substantially cylindrical shape, and a bottom wall 2 of substantially truncated conical shape, the central part of which is provided with an air outlet member 3.

In accordance with one of the novel features of the present invention, said sidewall 1 is provided with at least one vertically elongated louvered aperture 4 provided with a flange 4a projecting angularly towards the inside of the casing, as shown in detail in FIGURE 2.

In turn, the bottom wall 2 of said casing A has been provided with a plurality of elongated louvered apertures 5, each provided with vanes or flanges 5a, and defining air inlet passages, all of which are slanted in the same direction. The purpose of this arrangement is to permit entry into the filter assembly of outside air to be filtered and to direct the air into the casing, causing it to follow a circular trajectory. The louvered openings 5 are arranged, preferably, in three groups spaced from each other and disposed in a substantially tangential direction relative to said central air outlet member 3.

As previously mentioned, the aperture or apertures 4 provided in the sidewall of the casing 1, have a flange 4a inclined inwardly in such a direction that the slanting passage formed thereby is disposed in the path of movement of the air passing through openings 5 in the bottom wall 2 of the casing A. The purpose of the aperture 4 is to provide a passage through which solid matter entrained in the moving air can be expelled to the atmosphere.

The casing A, at the upper edge thereof, is formed to provide a peripheral ledge 6 and a throat portion 7 to which partition C is affixed. The partition is of inverted truncated conical shape having a central opening 30 defined by an annular lip 8 surrounding the air outlet member 3 in the bottom of the casing, and defining with the bottom wall of the casing a first chamber 10 in which incoming air is rotated and centrifuged. Between the partition C and the filter element D thereabove a second chamber 9 is provided wherein the semifiltered air is rotated in a direction opposite to the direction in which the air in the first chamber is rotated, as will be later described.

The details of FIGURES 2 and 3 in turn illustrate that the partition C is provided with a plurality of narrow radial louvered openings 12, the longitudinal edges of which are shaped with corresponding vanes or flanges 12a, all of said flanges being inclined in the same direction but opposite to that of flanges 5a of openings 5 provided in the bottom of the casing, excepting one or more flanges 12b which are inclined oppositely to the flanges 12a. That is, the flanges 12b are inclined in the same direction as the louvered openings 5 provided in said bottom wall 2 of the casing. This can be seen clearly in detail in FIGURE 4.

The filter element D consists of a disc 13 of pleated cloth or similar material impregnated with an appropriate dust collecting composition to enhance its filtering characteristics. As can be seen from FIGURE 3, the disc 13 is provided with an outer ring 14a adapted to seat on the peripheral ledge 6 with which the casing A is provided. The disc 13 also has an inner or central ring 14b which engages a seal 16 of resilient or spongy material, surrounding the central air outlet member 3 of said partition C. The disc is retained in postion beneath a circumferential groove 17 formed in the neck portion 18 of the member 3, by means of a resilient ring member E fitted into said groove.

A removable cover B is adapted to close the casing A to form the top wall thereof and includes a seal 19 of resilient material affixed thereto. Said cover B is held in sealing engagement with the casing A by means of a nut 20 threaded onto screw 21, the lower end of which, by means of a member 22 or other appropriate means, is connected to a central tube 23 providing the means of connecting the filter assembly to the carburetor, or with the air intake thereof.

The central tube 23 is provided at its top edge with a flat flange 24 supporting a seal 25 of resilient material which engages the bottom of the casing surrounding the opening 3. The seal 25 is intended to absorb engine vibrations and at the same time provide an adjustable sealing means between the tube 23 and the casing A.

For purposes which will be later described, at least one louvered opening 26 is formed in the throat portion 7 of sidewall 1 of the casing and the adjacent side edge of the partition C so that the flange 26a is directed inwardly but is inclined oppositely to the inclination of the flange or flanges 4a formed in the lower sidewall of the casing A.

The filter is also provided with means to aspirate the oily vapors from the engine to the second chamber 9. Said means consists of a tube 27, one one of which is secured to the bottom wall of partition C at an opening 27a therein, and extends downwardly through the bottom wall 2 of the casing. The opening 27a is preferably formed in flange 12b. The opposite end of tube 27 is connected to a flexible tube 28, which in turn is connected to the crankcase vent tube outlet 29, an automatic drain-off being provided to discharge the oil condensed in said tubes 28 and 29. Flexible tube 28 can also be connected directly to the inside of the engine if desired, for example, to the valve cover.

The operation of the above-described filter is as follows:

The outside air to be filtered is aspirated into the lower chamber 10 through apertures 5 located in the bottom wall 2 of casing A and, due to the inclination of flanges 5a of said apertures, the air inside of said chamber is submitted to a centrifugal movement, the velocity of which depends on the degree of aspiration. As a result of this movement, solid impurities entrained by said air are projected against the sidewall 1 of said casing and are mostly expelled through the side opening or openings 4 due to the deflecting action exerted by the flange 4a.

From chamber 10, the moving air is drawn upwardly through openings 12 in the bottom of partition C into the upper chamber 9 and, due to the inclination of flanges 12a, the air is forced to circulate in a direction opposite to the direction in which it was circulated in lower chamber 10. The velocity of the air in chamber 9 is greater than it was in lower chamber 10, due to the fact that the capacity of said upper chamber 9 is smaller. Nevertheless, the velocity may be controlled within certain limits by varying the amplitude and the number of apertures 12 communicating with both the upper and lower chambers.

A further effect of the centrifugal movement of the air is that the lighter impurities which have been able to reach the upper chamber 9 due to entrainment in the moving air, will in part be expelled outwardly through the aperture or apertures 26 formed in the sidewall 1 of the casing and in partition C, due to the deflecting action exerted by flange 26a as shown in FIGURE 2. The remaining impurities will reenter the lower chamber 10 dependent upon the deflecting action provided by the corresponding flange or flanges 12a, and are submitted to a new filtration cycle. From the upper chamber 9, the air passes through filter element 13, which retains the remaining impurities entrained by the air being filtered. The filtered air is then drawn into the carburetor through central tube 23.

During the filtering process, the oil vapor and other vapors preferably removed from the crankcase, are conducted by tubes 28 and 27 into upper chamber 9 where the vapors, through impregnation, will bring about a weight increase in the lighter particles suspended in the air to be filtered, thus facilitating the expulsion of said particles through the aperture or apertures 26, or their return through lower chamber 10 through the corresponding aperture or apertures 12b, to be submitted to a recycling of the centrifugal process. The aforesaid vapors also moisten filter D and increase its filtering capacity.

It is to be pointed out that the vapor contains gases withdrawn from the crankcase. Such gases may be used as working fuel, and in such case, the filter device operates as a recuperator, although this is not its primary purpose.

It should also be noted that filter element D, in its assembled position on rings 14a and 14b, maintains a radial pleating which, apart from reducing restriction, increases its effective surface of the filter.

I claim:

1. An air filter for carburetors of internal combustion engines comprising in combination:

a substantially cylindrical casing A including a sidewall 1, a bottom wall 2 of truncated conical shape, and a removable cover B providing a top wall for the casing, said bottom wall having a centrally disposed air outlet opening 3 and a plurality of elongated, louvered, air inlet openings 5 tangentially disposed relative to said central opening 3, said louvered air inlet openings 5 all being oriented in the same direction to impart a whirling motion to air passing therethrough, a partition C including a convex bottom wall portion disposed within said casing A and spaced above said casing bottom wall 2 to provide a first air receiving chamber 10 therebetween, said partition C provided with a central opening concentric with said air outlet opening 3 and a plurality of elongated louvered openings 12 in its bottom wall, some of said last mentioned louvered openings oriented in an opposite direction relative to the air inlet openings 5 in said casing bottom wall, and at least one of said louvered openings in said partition bottom wall oriented in the same direction relative to the air inlet openings 5 in said casing bottom wall, a filter element 13 provided with a central opening concentric with the central openings in said casing 1 and partition C, said filter element disposed within said casing above and spaced from said partition C to provide a second air receiving chamber 9 therebetween, means 20, 21, 22 23, 24, 25 connecting said casing A and cover B to the air intake of the carburetor, a tube 27 secured at one end to the bottom wall of said partition C adjacent an opening therein, and communicating with said second air receiving chamber 9, said tube extending through said first chamber 10 and through the bottom wall 2 of the casing, conduit means 28 connected at one end to the lower end of said tube 27 and connected at its other end to the crankcase of said engine, the vapors from the crankcase of the engine being drawn through said conduit means and said first mentioned tube 27 into said second chamber 9 to moisten said filter and impregnate dust particles entrained in the air being filtered in said second chamber, whereby air aspirated through the louvered aid inlet openings 5 in said bottom wall is submitted to a whirling centrifugal movement in one direction in the first chamber 10, then passes upwardly through the louvered openings 12 in said partition C into said second chamber 9 and flows in a reverse centrifugal direction, through the filter element 13 and into the air intake of the carburetor.

2. The air filter as set forth in claim 1, wherein the sidewall 1 of the casing is provided with at least one louvered opening 4 in the first chamber 10 defined by said bottom wall 2 and said partition C to provide an outlet for solid particles entrained in the centrifugally moving air within said chamber.

3. The air filter as set forth in claim 2, wherein the second chamber 9 has a louvered opening 26 therein to provide an outlet for solid particles not evacuated through said louvered opening 4 in said first chamber.

References Cited

UNITED STATES PATENTS

| | | | |
|---|---|---|---|
| 1,689,104 | 10/1928 | Bennett | 55—429 X |
| 1,712,947 | 5/1929 | Blair | 55—330 X |
| 1,745,950 | 2/1930 | Orem | 55—431 X |
| 1,912,657 | 6/1933 | Quam | 55—397 X |
| 2,193,479 | 3/1940 | Donaldson | 55—420 |
| 2,594,490 | 4/1952 | Patterson | 55—326 X |
| 2,904,129 | 9/1959 | McMichael | 55—419 X |
| 3,076,555 | 2/1963 | Jackson et al. | |
| 3,172,399 | 3/1965 | Lentz et al. | |

FOREIGN PATENTS

| | | |
|---|---|---|
| 201,047 | 12/1958 | Austria. |
| 901,292 | 7/1962 | Great Britain. |

HARRY B. THORNTON, *Primary Examiner.*

D. TALBERT, *Assistant Examiner.*